United States Patent Office 3,029,863
Patented Apr. 17, 1962

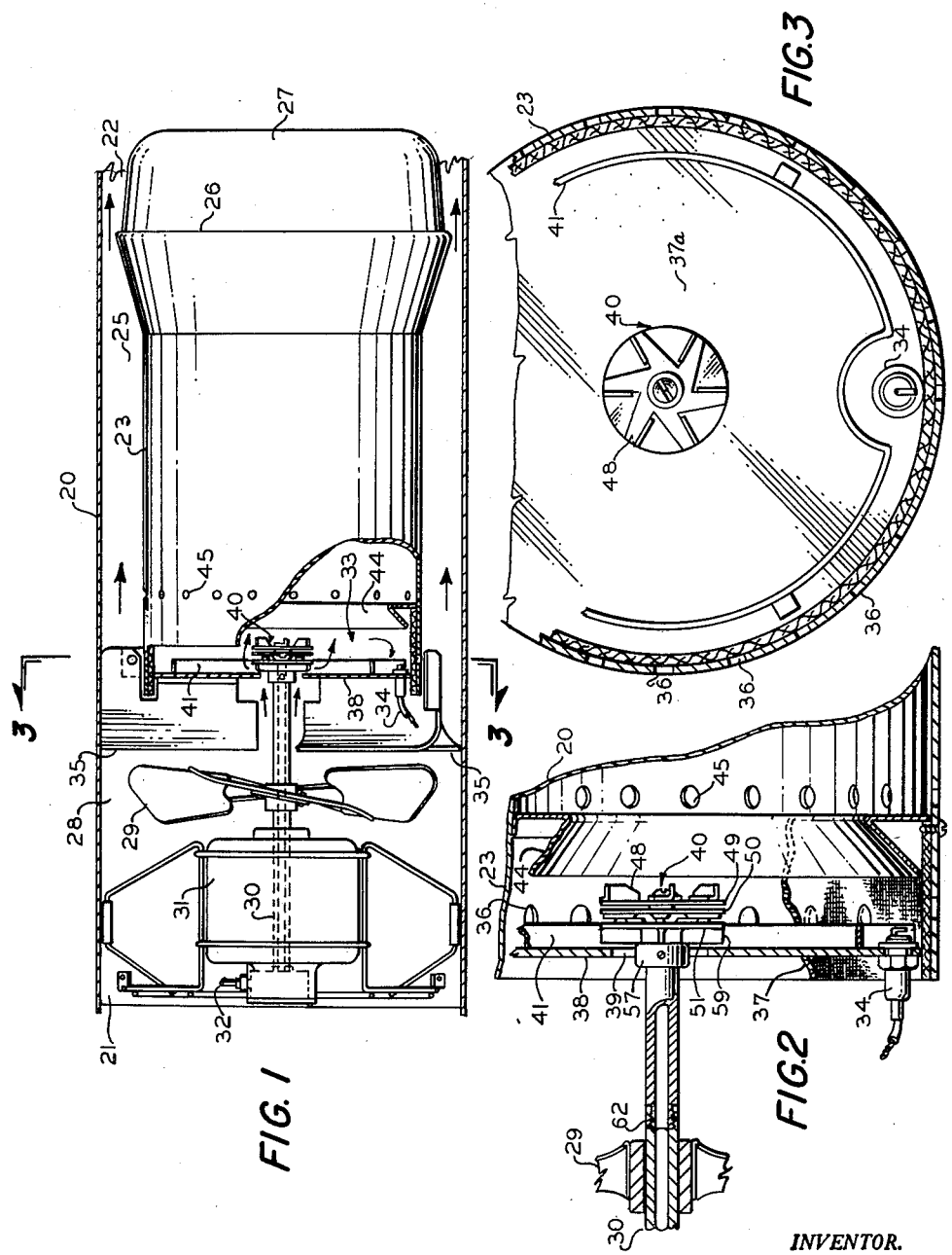

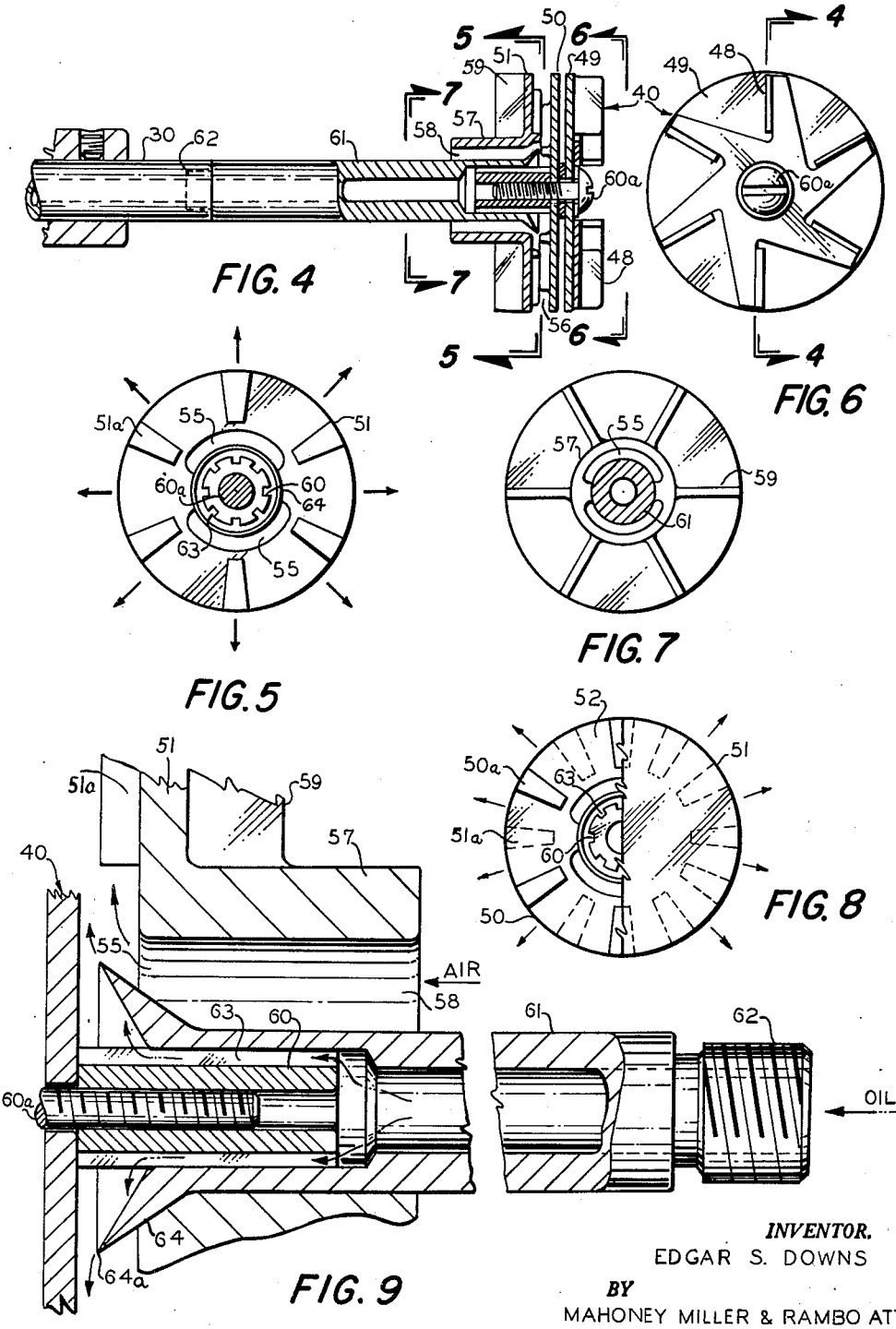

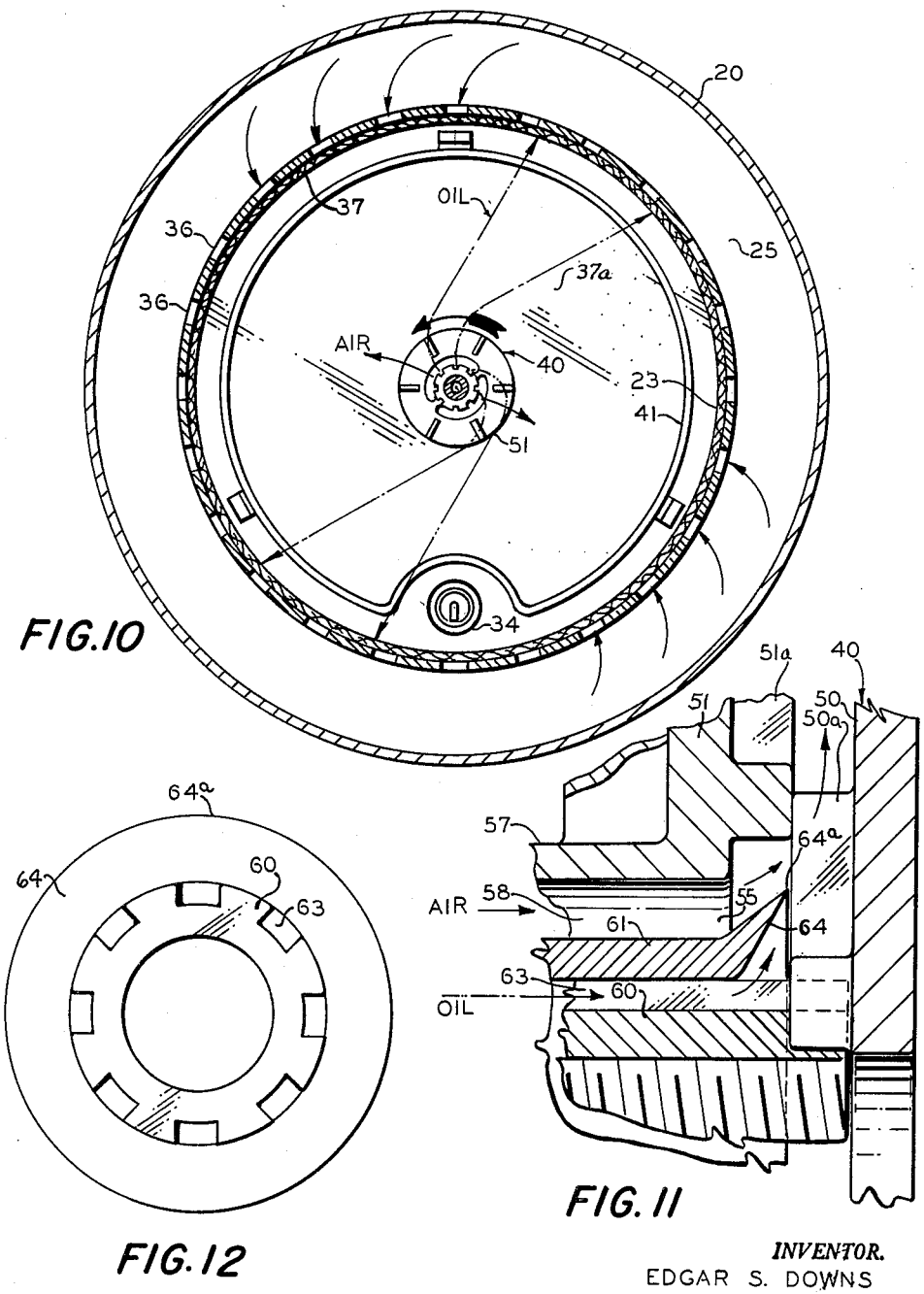

3,029,863
LIQUID FUEL BURNING HEATER
Edgar S. Downs, P.O. Box 242, Worthington, Ohio
Filed June 22, 1960, Ser. No. 37,874
3 Claims. (Cl. 158—4)

My invention relates to a liquid fuel-burning heater. It has to do, more particularly, with the burner of a heater of the oil-burning type. It relates to that general type of oil-burning burner which uses a mechanical spinner that receives the oil from a source of supply and throws it outwardly by centrifugal force through a surrounding combustion chamber into contact with an annular wall surface thereof.

Prior art burners of this type have not been completely satisfactory in regard to efficient burning of the oil. It is my belief that this is due to the design of the spinner and to the design of the associated combustion chamber. The spinner has not been designed to obtain sufficient breaking up of the oil into droplets as it is spun off the spinner and into the surrounding combustion chamber and the supply of primary air for combustion, usually through the spinner, has not been sufficient and effectively directed to intermingle with the oil droplets and cause effective combustion as the mixture passes radially outwardly through the combustion chamber. Also, the annular outer wall of the combustion chamber is usually metal or some other non-absorbing material and when the unburnt oil strikes it, the oil is deflected to the bottom of the chamber where it tends to accumulate in a pool.

According to my invention, I provide an oil-burning heater having a burner which is of the general mechanical spinner type. However, the mechanical spinner is of special novel design and construction so that the oil supplied thereto will be thrown off as small discrete droplets and so that sufficient primary air for combustion is supplied with the droplets as they are thrown off the spinner and is intermingled with the droplets to bring about effective combustion of at least part of the oil as it passes radially through the combustion chamber. Although some of the oil burns as droplets in suspension, some of the droplets also reach the outer annular wall of the combustion chamber, and this is especially true in the starting of the burner. Therefore, this wall is of novel form and is mainly of a liquid-absorbing ceramic material, preferably a ceramic cloth, and arranged in the combustion chamber to obtain optimum combustion conditions. The annular absorbent wall will by capillary attraction absorb the oil and spread it to expose a greater area for evaporation. Also, I provide a novel arrangement for supplying air for combustion to the absorbent wall.

A heater having my burner is very efficient in vaporizing and burning the oil with the formation of little carbon or soot and will require little or no maintenance in operation and will be completely safe in operation. It, therefore, is very useful as a portable heater under conditions where a stack or flue is not available, although it will be equally useful in any application where clean and efficient burning of oil is desirable.

In the accompanying drawings, I have illustrated the preferred embodiment of my invention, but it is to be understood that specific details of the burner and heater construction can be varied without departing from basic principles of my invention.

In these drawings:

FIGURE 1 is a longitudinal sectional view illustrating a heater in which my invention is embodied.

FIGURE 2 is an enlarged detail view in axial section of the spinner and associated combustion chamber.

FIGURE 3 is an enlarged transverse sectional view taken along line 3—3 of FIGURE 1 but with the tubular casing removed for clarity.

FIGURE 4 is an axial sectional view taken along line 4—4 of FIGURE 6 through the spinner.

FIGURE 5 is a transverse sectional view taken along line 5—5 of FIGURE 4 through the spinner.

FIGURE 6 is a face view of the spinner taken along line 6—6 of FIGURE 4.

FIGURE 7 is a transverse sectional view through the spinner taken along line 7—7 of FIGURE 4.

FIGURE 8 is a diagrammatic face view of the spinner with one of the discs thereof being broken away and showing the fluid directing ribs on one disc and the relative positions of the cooperating ribs on the other disc by broken lines.

FIGURE 9 is an enlarged axial sectional view through a portion of the spinner showing the oil supplying and air supplying arrangement thereof.

FIGURE 10 is an enlarged diagrammatic transverse sectional view through the heater at the burner section illustrating the action of the spinner in relationship to the annular burner wall and the supply of primary air for combustion thereto.

FIGURE 11 is an enlarged axial sectional view of the spinner showing the oil and oil supply arrangement.

FIGURE 12 is an enlarged end view of a supporting plug used in the spinner.

With reference to the drawings, in FIGURE 1 I have illustrated the general arrangement of a heater in which my burner may be disposed. This heater is shown as being of the small portable horizontal axis type although it is to be understood that my burner may be mounted in various other types of heaters and with its axis vertical or in other positions. However, with my burner it is possible to obtain clean and efficient combustion without the use of a stack or chimney and, therefore, it is particularly adaptable to a portable heater.

The heater shown comprises a tubular outer casing 20 which is open at its inlet end 21 and at its outlet end 22. Within the tubular casing 20 and in concentric relationship therewith toward the outlet end thereof is a combustion chamber 23 which is mainly of tubular form and is of smaller diameter than the casing 20 so that an annular air passageway 25 is provided therebetween. This chamber 23 is provided with a flared outlet end 26 in which is concentrically disposed a cup-shaped baffle member 27 which is of less diameter than the flared end 26 to provide an annular outlet for the combustion chamber. The chamber 23 is of less length than the casing 20 to form the fan chamber 28 at the inlet end of the casing 20. This chamber 28 has a fan 29 disposed therein which is mounted on a motor shaft 30 driven by an electric motor 31 which is suitably supported concentrically within the chamber 28. The shaft 30 is hollow and receives oil or other liquid through a connection 32 from a suitable source of supply. The fan 29 is of suitable form to draw air into the inlet 21 of the casing 20 and force it forwardly through the burner unit 33 into the combustion chamber 23. The burner unit 33 is disposed at the inlet end of the combustion chamber 23. Suitable igniting means 34 is provided for igniting the oil supplied to the burner. Turning vanes 35 are mounted on the rear of the tubular casing 20 for straightening the air flow from the propeller fan 29 and building up static pressure behind the combustion chamber.

The burner unit 33 is carried within the inlet or rear end of the combustion chamber 23 in concentric relationship therewith and with the casing 20 and is supported in such position within the casing by means of the vanes 35. The combustion chamber 23 is preferably of metal and in its side adjacent its rear end is provided with a row of angularly spaced openings 36 extending therethrough and disposed at closely spaced angular positions around the combustion chamber 23. These openings are for supplying part of the primary air for combustion, which comes from the fan 29, through an annular absorbent ring or burner wall 37 fitted snugly within the combustion chamber wall. These openings merely extend to and not through the wall 37. The main source of primary air will be discussed later.

The wall 37 is made of a suitable liquid absorbent, heat-resistant ceramic material. It may be of ceramic paper or felt but I prefer to use a ceramic woven cloth. The cloth material which I preferably use will be discussed more in detail later.

Located centrally within the burner chamber 37a formed by the annular wall 37 is a mechanical spinner 40. This spinner is carried by the motor shaft 30 which projects centrally into the burner chamber. This spinner is adapted to throw oil droplets intermingled with air from the center of the burner chamber 37a toward the outer annular wall 37. The spinner is associated with a back plate 38 supported within the rear end of the combustion chamber. It is provided with a central primary air metering hole 39 through which the main supply of primary air is supplied to the burner by the fan 29. The shaft 30 extends forwardly through the opening or hole 39 and is concentric therewith. Supported at the front face of the back plate 38 is an axially projecting ring 41 which is concentric with the opening and the absorbent ring or wall 37 and is located radially therebetween for purposes which will be specified later. Directly ahead of the ring 41 and associated absorbent ring 37 is a conical or flared collar 44. This collar 44 is located between the primary air openings 36 at the absorbent ring 37 and a similar row of angularly spaced openings 45 in the wall of the combustion chamber 23 which serve as secondary air openings. It will be noted that the forward edge of the ring 41 is behind the openings 36.

The spinner 40 is of novel construction and is made of a plurality of parts concentrically mounted on the forward end of the hollow shaft 30. It includes a forward fan 48 which is provided with vanes for stirring up the air adjacent thereto and for creating a swirling action of the flame in the burner chamber. This tends to recirculate hot burning gas, directing it at the absorbent wall 37 and thereby supplying heat to rapidly evaporate the oil from such wall. Directly behind the fan 48 is a plate or flat disc 49. Spaced slightly behind the disc 49 is a plate or disc 50 and behind this disc 50 in spaced relationship thereto is a plate or disc 51. The discs 50 and 51 each carry radial fluid-directing ribs 50a and 51a, respectively. These ribs project towards each other to a common radial plane but as noted in FIGURE 8, they are in angularly staggered relationship. Also, as noted in FIGURE 8, each rib 50a and 51a is wedge-shaped or tapered from its outer end at the outer edge of the disc to a point adjacent its inner end which is spaced substantially from the centers of the discs. The ribs 50a and 51a thus provide radially extending passageways 52 adjacent the outer edge of the discs which diverge outwardly as indicated. Adjacent the center of the disc 51 at the inner ends of the passageways 52 are the discharge throats 55 of the arcuate air passageways 58 for permitting air to be forced by the fan therethrough into the space 56 between the discs 50 and 51 where its direction will be changed to a radial outward direction. The disc 51 is provided with a rearwardly extending hub 57 which is spaced from the hollow shaft 30 to provide the arcuate air passageways 58 which, as indicated, conduct air from the fan 29 to the space between the discs 50 and 51. Mounted on the hub 57 is a fan 59 which is positioned just ahead of the primary air opening 39 concentric therewith and is provided for turning the axially entering air at right angles and directs it outwardly at high velocity toward the ring 41 and absorbent wall 37. The ring 41 will, in turn, slow down a portion of this primary air and produce an eddy current outward of it adjacent the absorbent wall 37 to improve lighting and burning qualities of the burner. All the discs 49, 50 and 51 and the fan members 48 and 59 are carried by means of a bolt 60a which is threaded into a plug 60. This plug 60 is of star wheel shape, as shown in FIGURES 5 and 12, to permit oil to flow past it and projects from the forward flared end of an oil slinging tube 61 which has a threaded rear end 62 screwed into the threaded forward end of the shaft 30.

Thus, the member 61 will receive oil through the shaft 30. This oil will pass forwardly through the channels 63 provided by the star-shaped plug 60. The flared outer end or collar 64 of the member 61 provides means for changing the flow of oil from axial direction to a radial direction between the discs 50 and 51. This flared end 64 provides an angular surface for changing the direction of the flow of oil and directing it outwardly and its extreme edge is a knife edge 64a from which the oil is thrown and because of the high speed of rotation of this member 61, the oil will be thrown in the form of droplets therefrom. At the same time, as indicated in FIGURE 11, air will be forced into and through the passageway 58 by the fan 29 and will be deflected radially outwardly by the flared end 64 to mingle with the oil thrown outwardly at the opposite side thereof. This will insure that the oil is not only formed into droplets but that the droplets will be intermingled with air for combustion which reaches it from the passageway 58, being deflected by the flared end 64 into intimate mixture with the oil droplets.

The oil and air mixture is directed outwardly through the space between the discs 50 and 51 and the direction thereof is aided by the passageways 52 formed between the ribs 50a and 51a on the opposed discs 50 and 51. It will be noted that the space between the discs 50 and 51 is, as shown in FIGURE 2, aligned with the row of openings 36 which is outside the annular absorbent wall 37.

In the use of this burner, the fan 29 is started and the oil supply is allowed to reach the spinner 40. The igniter 34 is used to initially ignite this oil and it will be noted that this igniter is adjacent the absorbent ring 37. As indicated above, especially at the time the heater is started, the oil will reach the absorbent ring 37 and will be absorbed thereby. This oil will be readily ignited. As the burner continues to operate, some of the oil will be ignited before it reaches the ring 37 since it will be thrown off the spinner as droplets intermingled with the air supplied at the spinner. This air includes primary air supplied both around and through the hub 57 by the fan 29. Additional primary air for combustion is supplied through the openings 36 behind or outwardly of the absorbent ring 37, the air also being forced by the fan 29 through these openings 36. The resulting flame will be caused to rotate or swirl about the spinner 40, especially because of the fan 48. This flame will be constricted as it passes forwardly through the flared baffle 44 and combustion will be further aided by the secondary air openings 45 ahead of the baffle 44 which also receive air from the fan 29.

The action of the spinner 40 in throwing off the oil and directing the air and oil mixture radially outwardly is illustrated best in FIGURE 10. In this function, the flared tube 61 is especially important as it changes the direction of air and oil flow from an axial direction to a direction radially outwardly where the oil droplets and air are intimately mixed and the mixture is directed toward the annular absorbent wall 37. Any oil reaching this wall 37 will be absorbed, spread out by capillary action, and will be readily reevaporated for further combustion. It will be noted that the spinner 40 creates a swirling and wiping action of the air and oil mixture around the inner surface of the absorbent wall 37, thus insuring effective evaporation and burning of the oil at the surface of the ring 37.

It is important to use material in the ring 37 which will be very absorbent and heat-resistant. Ceramic paper or felt may be used but it is preferred to use a ceramic woven cloth and this cloth is formed of woven yarn composed of long thin ceramic fibers. The cloth is preferably reinforced with steel strands woven therein.

An example of a suitable cloth which I have used is one known as Fiberfrax cloth produced from Fiberfrax long staple fibers by the Carborundum Company which has the following chemical composition:

$Al_2O_3$—51.3%; $SiO_2$—45.3%; $ZrO_2$—3.4%

Approximate fiber diameter:
  2 microns to 40 microns with a mean in the range of 4 to 10 microns.
Approximate fiber length:
  ½" to 10", averaging 2" to 3".
Density of the cloth:
  24 pounds per cubic foot.
Thickness of the cloth:
  0.020" to 0.250".
Thread count:
  8 per inch to 30 per inch, with an average of 15.

Other examples of suitable materials are cloths which could be made of Micro-Quartz fibers which are produced by LOF Glass Fibers Co. and which fibers are of 98% pure quartz, or of other fibers which have the necessary resistance to high temperature and will provide a cloth having the necessary high capillarity.

A high degree of capillarity is present in the ceramic cloth ring to provide lateral flow over the face of the ring in sufficient quantity to keep the ring well saturated with fuel. The high rate of evaporation from this wet ring provides a strong cooling action due to the latent heat of evaporation of the fuel. This cooling action tends strongly to prevent cracking of the fuel in the liquid state by lowering the temperature of the disc.

The ceramic cloth ring is composed of fibers that will withstand approximately 2000° F. for long periods of time without noticeable deterioration. These fibers must also withstand the effects of hot fuel and the products formed by chemical reaction of the fuel, either by oxidation or "thermal cracking" for long periods without noticeable deterioration.

For effective and carbon-free operation, the ceramic cloth ring is thin—not less than .020" and not more than .250" in thickness, and a thickness which I have found very satisfactory is .090".

It will be apparent that the spinner is of unusual construction and because of its special design and function, is very efficient in operation. The spinner will direct the oil and air mixture outwardly toward the absorbent ring or wall. The oil is thrown outwardly by the rotating knife-edge or lip through the space between the opposed axially-spaced rib-carrying plates and at the same time air is caused to travel between the plates at a high velocity, thereby keeping the flame from coming into that space. Also, the plates shield the oil-throwing knife-edge or sharp lip from radiant heat. This air comes from the upstream or inlet end of the sleeve associated with the spinner and is directed outwardly by the flared throat of the oil-throwing sleeve between the spaced rib-carrying plates. The spinner tends to impart spin to the air and oil coming off the sharp lip or edge, thereby improving light-off and quality of the fire. The upstream fan on the spinner imparts spin to the air entering the burner combustion chamber, thereby improving light-off by aiding flame-propagation and this fan also directs air entering the combustion chamber at right angles to the axis of the spinner, thereby causing it to flow outwardly toward the absorbent ring or wall and rapidly mix with the oil vapor emanating from the surface of the absorbent ring. The downstream fan on the spinner imparts spin to the burning gases in the burner combustion chamber and draws them into the center of the combustion chamber causing recirculation and promoting rapid burning. This fan also throws the hot air against the absorbent ring or wall and aids in rapid evaporation of the absorbed oil therefrom.

It will be further apparent that I have provided a burner structure having many advantages. It has been found in actual practice that when a burner of the type described is incorporated in a heater as indicated, it burns a large quantity of fuel for a given volume of combustion space compared to other burners and does it cleanly without smell or smoke and, therefore, is much more efficient than prior burners. By having the absorbent ring surrounding the spinner, it is possible to have a horizontal arrangement without danger of oil accumulating in the bottom of the burner but the burner is not limited to a horizontal arrangement. The burner has high performance after fast starting and gives good fire with intense burning and is capable of handling a large volume of fuel in a small combustion space thereby being a low-cost burner compared to its capacity. The spinner throws oil out into the ceramic cloth, especially at the time the burner is started, and this oil will be absorbed and reevaporated from the absorbent ring.

The absorbent ring or wall will receive a thin line of droplets of oil thrown from the spinner which strike it along a radial line in the same plane as the spinner and spreads this oil out, toward the front and rear edges of the absorbent ring or wall, thereby increasing the wetted area of the ring and providing increased surface from which the oil can be evaporated more effectively. The fact that the material of the ring or wall is a good heat insulator permits it to warm up quickly, thereby making the heater easy to light. Also, the fact that the ring or wall absorbs the oil quickly prevents accumulation of oil in the bottom of the burner chamber which is especially important in starting the burner. The primary air holes in the metal wall surrounding the absorbent wall, which do not extend through the absorbent wall, keep the absorbent material clean by bleeding air into the area of the absorbent wall where there is greatest fuel concentration due to the fact that these holes are in substantially the same radial plane as the spinner. This serves to prevent cracking of fuel in the absorbent material by supplying enough oxygen to the fuel immediately and also by cooling the oil in the pad. The secondary air holes downstream from the conical baffle introduce a final amount of air to complete combustion at the proper place along the flame. The conical baffle and the annular baffle or ring upstream therefrom serve to separate burning rich gases from the cold secondary air permitting them to mix gradually and toward the center of the combustion chamber away from the sides of the chamber where their impingement might cause carbon formation and the conical baffle especially serves to direct the burning gases toward the center of the chamber.

Various other advantages will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A burner for burning liquid fuel comprising a combustion chamber having a peripheral wall, a spinner rotatably mounted within the combustion chamber in radially spaced relationship to the surrounding peripheral wall of the combustion chamber and in a transverse plane relative thereto, means for supplying liquid fuel to the spinner, means for supplying air for combustion to the spinner in cooperative relationship with the liquid fuel supplied thereto, means for rotating the spinner so as to throw off radially outwardly therefrom in said transverse plane the liquid fuel supplied thereto in the form of droplets, and a ceramic wall surrounding said spinner and spaced radially outwardly therefrom between the spinner and the peripheral wall of the combustion chamber, said ceramic wall being of material of high capillarity for receiving droplets of the liquid fuel thrown off by the spinner and spreading it throughout the area thereof to provide a large area for rapid evaporation and burning of the liquid fuel, said ceramic wall extending axially in both directions relative to the transverse plane of the spinner so that droplets of the liquid fuel thrown off by the spinner will contact with the ceramic wall and will be spread out by the capillarity thereof to saturate the wall, said ceramic wall being of porous material and means for supplying additional air through said porous ceramic wall from the outer side thereof to cool the fuel in the ceramic material, to oxygenate it to prevent cracking, and to provide additional air for combustion.

2. A burner according to claim 1 in which the combustion chamber is of tubular form of annular cross-section so that said peripheral wall thereof is annular, said ceramic wall being in the form of a ring, said means for supplying liquid fuel to the spinner supplying it adjacent the axis thereof and said means for supplying air to the spinner supplying it adjacent the axis thereof so that air is supplied with the fuel droplets as they are thrown off the spinner and is intermingled with the droplets.

3. A burner according to claim 2 in which said ceramic ring is supported by said peripheral wall of the combustion chamber, and the means for supplying additional air comprises openings extending only through said peripheral wall to said ceramic wall, said openings being located in said transverse plane of the spinner.

References Cited in the file of this patent

UNITED STATES PATENTS

| | | |
|---|---|---|
| 980,801 | Kraus | Jan. 3, 1911 |
| 1,419,380 | Hoffman | June 13, 1922 |
| 1,497,829 | Allen et al. | June 17, 1923 |
| 2,025,526 | Rodler | Dec. 24, 1935 |
| 2,039,937 | Schroeder | May 5, 1936 |
| 2,112,888 | Greenawalt | Apr. 5, 1938 |
| 2,630,166 | McKee | Mar. 3, 1953 |

FOREIGN PATENTS

| | | |
|---|---|---|
| 691,430 | Germany | May 25, 1940 |